United States Patent Office 3,108,117
Patented Oct. 22, 1963

---

3,108,117
3-BENZYL-1,2-DILOWERALKYL-3-PYRROLIDINOLS
Yao Hua Wu, Rolland Frederick Feldkamp, and William Andrew Gould, Evansville, Ind., assignors to Mead Johnson & Company, Evansville, Ind., a corporation of Indiana
No Drawing. Filed Jan. 15, 1960, Ser. No. 2,571
2 Claims. (Cl. 260—326.5)

This invention relates to new 3-benzyl-3-pyrrolidinols and to processes for preparing the same, and has for an object the provision of 3-benzyl-3-pyrrolidinols having the following structural formula:

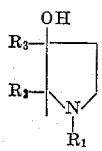

wherein $R_1$ and $R_2$ are lower alkyl and $R_3$ is benzyl. The therapeutically acceptable acid addition salts of these compounds are also contemplated as a part of this invention.

The present invention is a continuation-in-part of our prior United States patent application Serial No. 792,712, filed February 12, 1959, now abandoned.

The compounds of this invention are useful as pharmaceutical agents and have utility as vasopressor and vasodepressor agents having long duration of action. The dosage for mammals is from about 0.5 to 5.0 milligrams per kilogram of body weight in order to obtain the desired effect. The compounds may be administered orally in the form of tablets, wafers, elixirs, liquid suspensions, powders, capsules or the like, or may be injected intravenously in solutions.

Several methods are available for producing the compounds of this invention and it may be stated that it is preferred to prepare them from 1-acyl-3-pyrrolidinols or the 1-carbalkoxy-3-pyrrolidinols disclosed and claimed in Wu, Feldkamp and Lobeck application Serial No. 792,711, filed February 12, 1959, now abandoned.

By one such method the 1-acyl or 1-carbalkoxy group on the substituted 3-pyrrolidinol is reduced by means of an alkali metal aluminum hydride, such as lithium aluminum hydride, whereby to form the 1-lower alkyl substituted compounds.

The acid addition salts of the free base compounds of this invention may be prepared by conventional techniques. For example, the hydrochloride salts may be prepared by neutralizing an alcohol solution of the free base with an equivalent amount of an alcoholic solution of hydrogen chloride. Other suitable acid addition salts of these compounds are the hydrobromides, hydroiodides, sulfates, phosphates, acetate, citrates, succinates, tartrates, benzoates and the like, and they are prepared by conventional methods.

For a more complete understanding of this invention, reference will now be made to a number of specific examples illustrating methods for preparing compounds of this invention.

EXAMPLE I

*3-Benzyl-1-Carbethoxy-2-Methyl-3-Pyrrolidinol*

An ethereal solution of benzylmagnesium bromide (0.1 mole) in 125 ml. of anhydrous ether was prepared in the usual manner. To this Grignard reagent was added with stirring and dropwise an ethereal solution of 1-carbethoxy-2-methyl-3-pyrrolidinone (12.0 g., 0.07 mole) in 125 ml. of anhydrous ether in thirty minutes. The Grignard reaction mixture, after stirring and refluxing for one hour, was poured into a mixture of 200 g. of ice and 10 g. of ammonium chloride. The ethereal phase was separated and dried with anhydrous magnesium sulfate. The residue obtained after removal of ether was fractionally distilled to obtain 93 g. (50.7%) of 3-benzyl-1-carbethoxy-2-methyl-3-pyrrolidinol as a thick oil, B.P. 148–153° (0.15 mm.).

*3-Benzyl-1,2-Dimethyl-3-Pyrrolidinol*

To a slurry of 4.18 g. (0.11 mole) of lithium aluminum hydride in 75 ml. of tetrahydrofuran was added slowly (ca. one hour) a solution of 3-benzyl-1-carbethoxy-2-methyl-3-pyrrolidinol (13.9 g., 0.05 mole) in 75 ml. of tetrahydrofuran. After refluxing for four hours, the mixture was cooled and treated dropwise with efficient stirring with 6 ml. of water. The solid was filtered off and extracted with hot ethanol. The filtrate and the ethanol extract were mixed. Removal of the solvents yielded a light colored solid. It was dissolved in isopropyl ether and decolorized with active carbon. On standing at 0°, 6.14 g. (59.7%) of 3-benzyl-1,2-dimethyl-3-pyrrolidinol crystallized in needles; M.P. 85–90°. The hydrochloride was prepared from the ethanol solution in 71.2% yield, M.P. 161–163°.

In this specification temperatures are expressed in degrees centigrade.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:
1. 3-benzyl-1,2-dimethyl-3-pyrrolidinol.
2. A compound selected from the group consisting of 3-benzyl-1,2-dilower alkyl-3-pyrrolidinol and the therapeutically acceptable acid addition salts thereof.

References Cited in the file of this patent

UNITED STATES PATENTS 2,878,264   Lunsford _____ Mar. 17, 1959

OTHER REFERENCES

Miller et al.: J. Am. Chem. Soc., vol. 73, pages 4895–4898 (1951).

Wagner-Zook: Synthetic Organic Chemistry, page 415 (1953), John Wiley and Sons, Inc.